R. C. DICKEN.
COMPRESSION INDICATOR.
APPLICATION FILED DEC. 1, 1919.
1,357,153.
Patented Oct. 26, 1920.
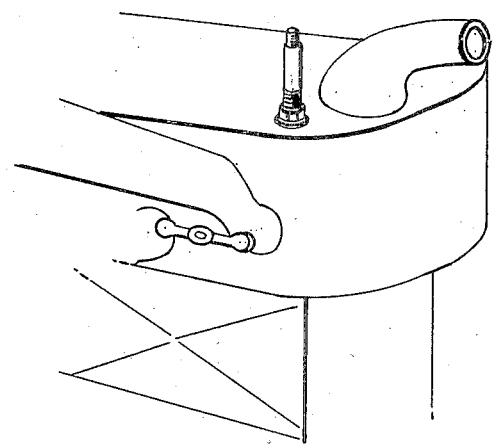
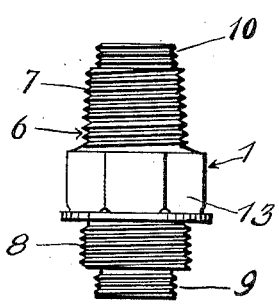
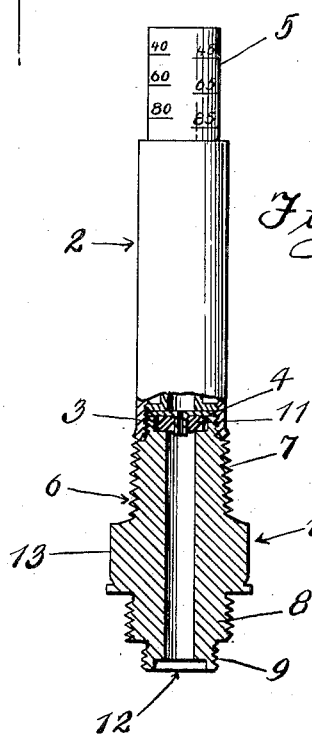
Inventor
R. C. Dicken
By H. B. Willson & Co.
Attorneys

UNITED STATES PATENT OFFICE.

RALPH CHESTER DICKEN, OF CENTRALIA, WASHINGTON.

COMPRESSION-INDICATOR.

1,357,153.  Specification of Letters Patent.  Patented Oct. 26, 1920.

Application filed December 1, 1919. Serial No. 341,629.

*To all whom it may concern:*

Be it known that I, RALPH C. DICKEN, a citizen of the United States, residing at Centralia, in the county of Lewis and State of Washington, have invented certain new and useful Improvements in Compression-Indicators; and I do declare the following to be a full, clear, and exact description of the invention, such as will enable others skilled in the art to which it appertains to make and use the same.

This invention relates to improvements in indicators for use in indicating the working pressure in a cylinder of an explosive engine, and it is especially designed for use in connection with automobile engines, although it is not restricted to such use.

The primary object of the invention is to provide a simple coupling for connecting a pressure gage to an engine cylinder, it being of such construction that it may be connected to a standard type of tire pressure gage and then screwed into a spark plug opening, whereby a compression test may be made.

Another object of the invention is to provide an attachment of the above mentioned character which is of such construction that it may be effectively used with two different standard spark plug openings.

A further object of the invention is to provide an attachment of the above mentioned type which is exceedingly simple in construction, strong, durable, and inexpensive to manufacture, yet highly effective in use.

Other objects and advantages of the invention may become apparent during the course of the following description.

In the accompanying drawing forming a part of this specification and in which like numerals are employed to designate like parts throughout the same, Figure 1 is a perspective view of a portion of an automobile engine equipped with my device.

Fig. 2 is an elevation of a device constructed in accordance with my invention.

Fig. 3 is an elevation of a pressure gage with my attaching means associated therewith, the attaching means being in section.

In carrying out my invention I employ attaching means 1 which may be detachably connected to a standard type of tire pressure gage 2, whereby the attachment may then be screwed into the spark plug opening of an explosive engine to indicate the pressure in the cylinders.

The tire gage 2 as shown is the well known "Schrader-Universal" type of gage, and for the sake of clear illustration I have shown a portion of the internal mechanism of that gage, which as shown, includes the internally threaded wall 3 and the combined closing plate and nipple 4 which is threaded or otherwise secured in the open end of the gage. As is well known, the air passes through the nipple into the interior of the gage and operates the graduated plunger 5. When the tire gage is used to determine the amount of air contained in the tire the lower end is closed by means of a screw-threaded cap (not shown), and when it is desired to secure my attachment on the gage it is only necessary to remove this cap, so it will be seen that no alteration of the gage is necessary and it will well serve two purposes, that is, as a tire gage, and as a compression gage.

My attachment 1 comprises a cylindrical body 6 having a bore extending therethrough, the body being threaded at its opposite ends as indicated at 7 and 8. The threads 8 are of a different pitch and size than the threads 7, so, it will be seen that the attachment may be screwed into two different standard spark plug openings. However, I desire it to be understood that while I have shown the threads 7 and 8 as being of different pitches for the above mentioned purpose, I desire it to be understood that these threads may be of any pitch and size to permit the attachment to be used with various sizes of spark plug openings, or, better say, spark plug openings having threads of different pitches and sizes. The extremities of the body 6 are reduced as shown at 9 and 10 and threaded to engage the internally threaded wall 3 of the pressure gage. It is obvious that the reason for reducing the extremities of the body in the manner shown is to enable the attachment to have interchangeable engagement with the threaded wall of the pressure gage. In other words, when the threaded portion of the body indicated at 8 is screwed into the spark plug opening the reduced end 10 is connected to the pressure gage, and when the portion 7 is screwed into the spark plug opening instead of the portion 8, then the attachment is reversed and the reduced end 9 threaded into the wall 3 of the gage. So, it will be seen that either end of the attachment may be effectively connected to the pressure gage. In order to obtain an air tight joint between the attachment 1 and the pressure gage I provide a suitable gasket 11 which surrounds the nipple on the plate 4 and is spaced from the wall 3 of the gage and when the attachment is connected to the gage the gasket 11 is seated in the socket 12 in the reduced ends of the body 6. The intermediate portion of the body is enlarged and flat-faced as shown at 13 to permit the use of a wrench.

While I have described and shown my attaching member as being used in connection with a "Schrader-Universal" tire pressure gage, I desire it to be understood that it may also be effectively employed with various other types of pressure gages.

A device constructed as set forth in the foregoing description will be found to be very convenient to automobile owners in that the usual "Schrader" tire gage carried by a great many owners of cars not only may be used to indicate the air pressure of the tire, but by simply removing the cap at the bottom of the gage and applying my attachment he may also use the same gage to indicate the compression within the cylinders of the engine. The device will be found extremely valuable to car owners whenever it is desired to determine just how much pressure is in the cylinders of the engine, and by properly threading the attachment it may be used to fit various sizes of spark plug openings such as are found on different makes of automobiles.

The manner of using my device is thought to be obvious from the foregoing description and drawings, and further description thereof is deemed unnecessary.

I claim:

1. A coupling for attaching a compression gage to an engine cylinder comprising a tubular body screw-threaded at its opposite ends to engage two different standard spark plug openings, the extremities of said body being reduced and screw-threaded for interchangeable screw-threaded engagement with the internally-threaded wall of a pressure gage, the intermediate portion of the body being enlarged to permit the use of a wrench.

2. A coupling for attaching a compression gage to an engine cylinder comprising a tubular body the opposite ends of which are screw-threaded, the threads at one end being of a different pitch from the threads at the opposite end to permit the engagement of said ends with two different standard spark plug openings, the extremities of said body being reduced and screw-threaded to permit either end of the body to have screw-threaded engagement with the threaded wall of a pressure gage, each reduced end being provided with a socket to receive a gasket and form an air tight connection between the body and gage, the intermediate portion of the former being enlarged to permit the use of a wrench.

In testimony whereof I have hereunto set my hand.

RALPH CHESTER DICKEN.